No. 633,542. Patented Sept. 19, 1899.
W. N. WHITELY.
BICYCLE HUB AND BEARING.
(Application filed Jan. 5, 1897. Renewed Feb. 21, 1899.)
(No Model.) 3 Sheets—Sheet 1.
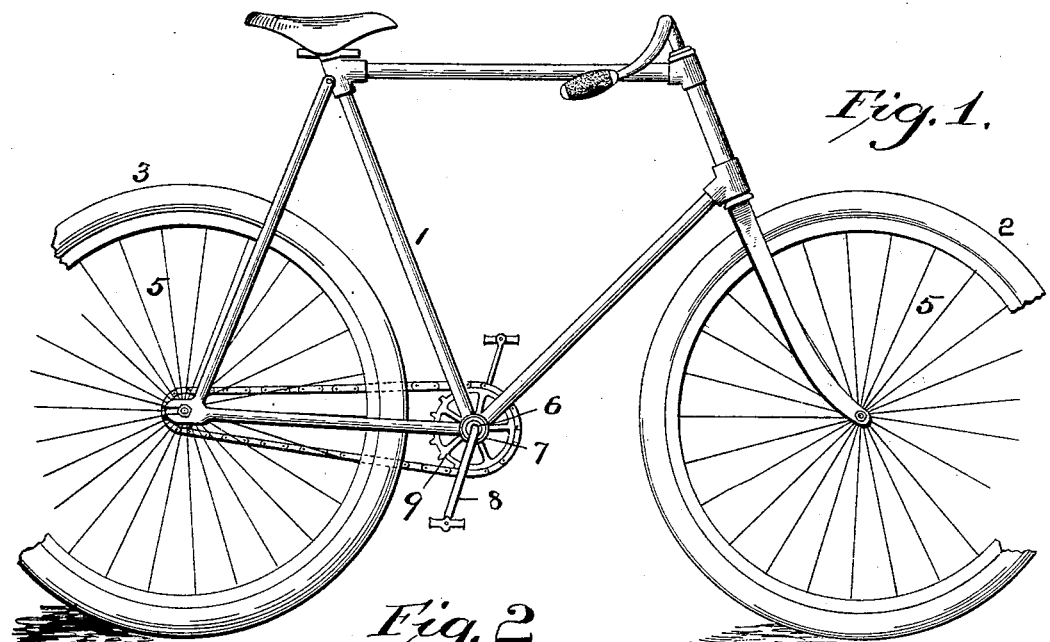
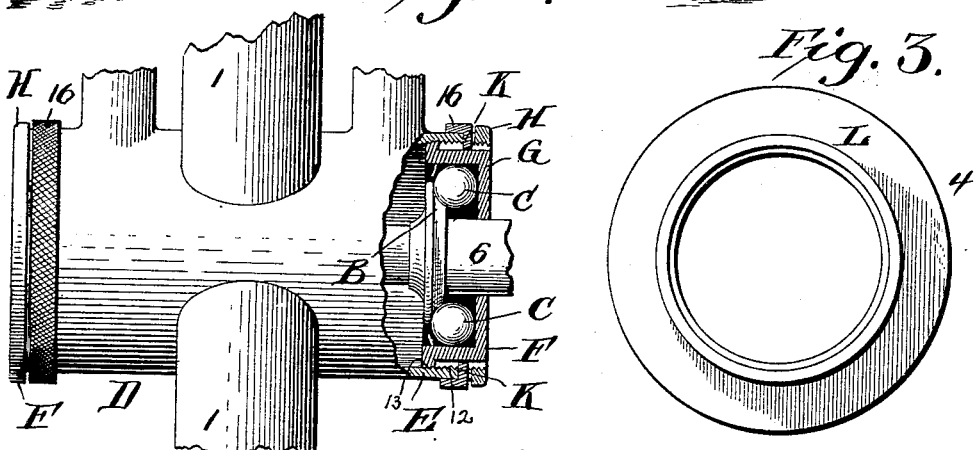
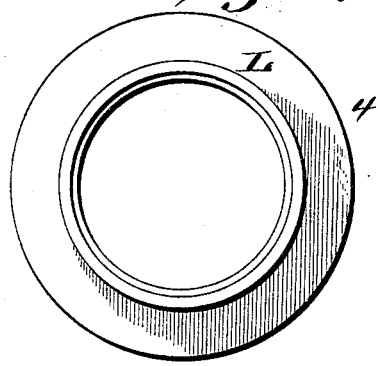
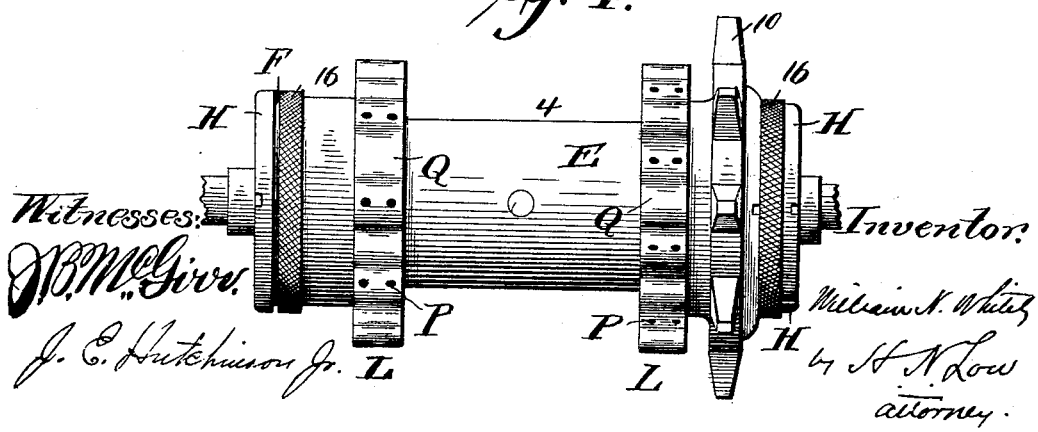
Witnesses: Inventor:
W. B. McGiv William N. Whitely
J. E. Hutchinson Jr. by H. N. Low
attorney.
THE NORRIS PETERS CO., PHOTO-LITHO., WASHINGTON, D. C.

No. 633,542. Patented Sept. 19, 1899.
W. N. WHITELY.
BICYCLE HUB AND BEARING.
(Application filed Jan. 5, 1897. Renewed Feb. 21, 1899.)
(No Model.) 3 Sheets—Sheet 2.
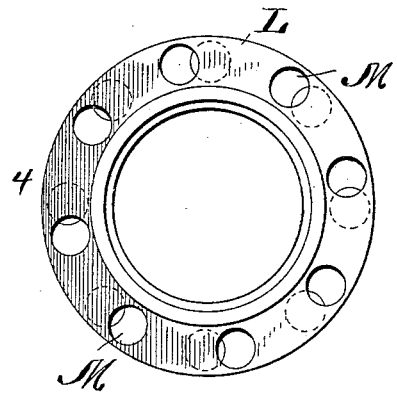
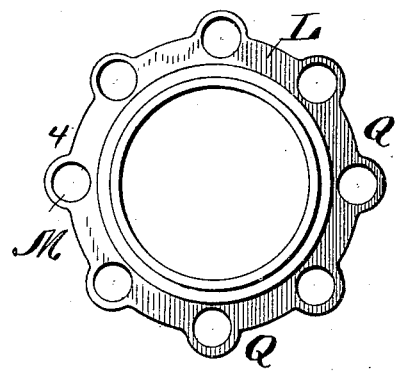
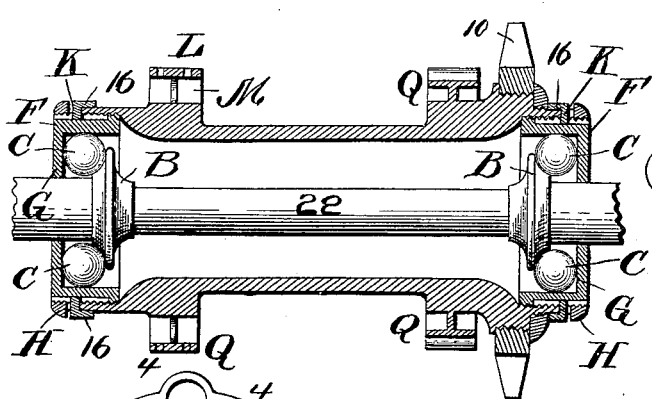
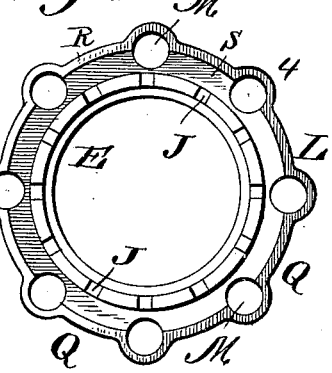
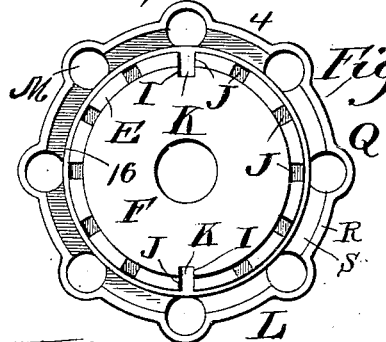
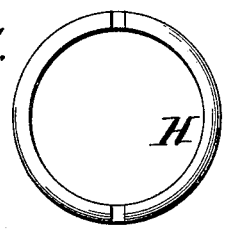
Witnesses:
J. B. McGirr.
J. E. Hutchinson Jr.
Inventor:
William N. Whitely
by H. N. Low
attorney No. 633,542. Patented Sept. 19, 1899.
W. N. WHITELY.
BICYCLE HUB AND BEARING.
(Application filed Jan. 5, 1897. Renewed Feb. 21, 1899.)
(No Model.) 3 Sheets—Sheet 3.
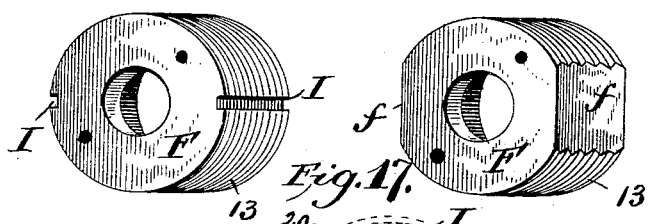
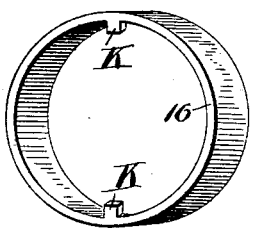
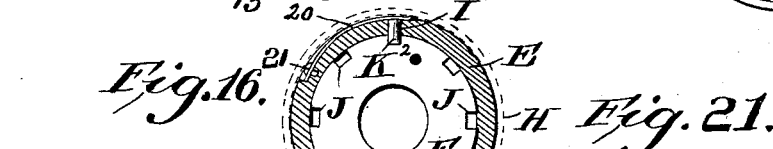
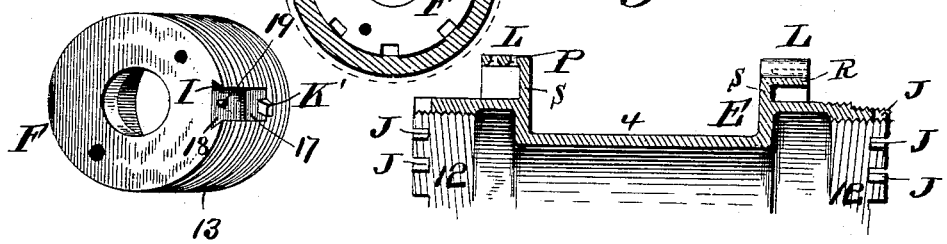
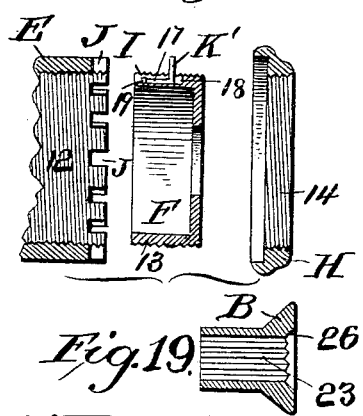
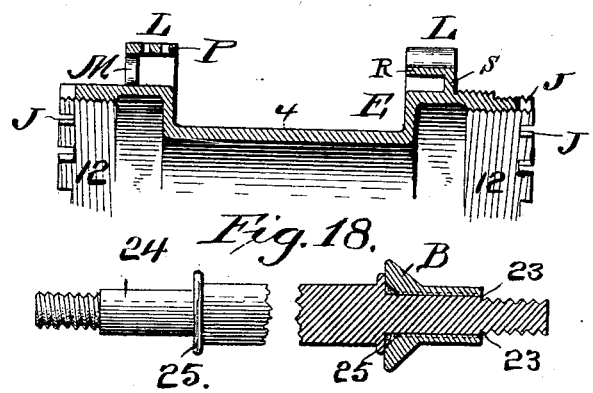
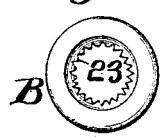
Witnesses:
J. B. McGirr.
J. E. Hutchinson Jr.
Inventor:
William N. Whitely
by H. N. Low
Attorney
THE NORRIS PETERS CO., PHOTO-LITHO., WASHINGTON, D. C.

UNITED STATES PATENT OFFICE.

WILLIAM N. WHITELY, OF SPRINGFIELD, OHIO, ASSIGNOR TO HIMSELF AND WILLIAM N. WHITELY, JR., OF SAME PLACE.

BICYCLE HUB AND BEARING.

SPECIFICATION forming part of Letters Patent No. 633,542, dated September 19, 1899.

Application filed January 5, 1897. Renewed February 21, 1899. Serial No. 706,424. (No model.)

*To all whom it may concern:*

Be it known that I, WILLIAM N. WHITELY, a citizen of the United States, residing at Springfield, in the county of Clark, State of Ohio, have invented certain new and useful Improvements in Bicycle Hubs and Bearings; and I do declare the following to be a full, clear, and exact description of the invention, such as will enable others skilled in the art to which it appertains to make and use the same.

My improvements relate both to the interior and exterior construction of bearings for bicycles and other purposes.

The former part of the invention is applicable to the bearing of the crank-shaft as well as to those of the front and rear wheels, and relates more particularly to the means for adjusting and securely locking in the adjusted position certain parts of the ball-bearings. It also relates to the means for securing ball-bearing shoulders or cones upon the rotary or fixed shaft. The latter part of the invention relates particularly to the production of a hub of light and strong construction adapted for straight tangent spokes.

The invention consists in the parts and combinations thereof hereinafter set forth and claimed.

In order to make the invention more clearly understood, I have shown in the accompanying drawings means for carrying it into practical effect without limiting my improvements in their useful applications to the particular constructions which, for the sake of illustration, I have delineated.

In said drawings, Figure 1 is an elevation of a bicycle embodying my invention. Fig. 2 is a plan view, partly in section, of that bearing-casing which contains the crank-shaft and is otherwise known as the "crank-hanger." Fig. 3 is an end view of one member of that bearing-casing which is adapted for the front or rear wheel, and is otherwise termed the "wheel-hub" before it is bored and formed to make seats for the attachment of tangent spokes. Fig. 4 is a plan view of a completed rear hub embodying my invention. Fig. 5 is an end view of the wheel-hub bored to form spoke-seats. Fig. 6 is a similar view of the hub, further formed exteriorly. Fig. 7 is a similar view of the hub grooved and flanged in its final shape. Fig. 8 is a similar view showing a portion of the hub with double tangent spokes attached thereto. Fig. 9 is a longitudinal sectional view of the rear hub-bearings, showing the axle in elevation. Fig. 10 is an end view of one of the wheel hubs and bearings with the locking-ring removed. Fig. 11 is an end view of the locking ring or nut. Fig. 12 is a perspective view of one of the members of a bearing-casing, otherwise known as the "adjustable cup;" Fig. 13, a similar view showing another form of the same. Fig. 14 is a perspective view of one form of the locking device for uniting the two members of the bearing-casing. Fig. 15 is a sectional view of the two members of the casing and the nut detached, illustrating another form of locking device. Fig. 16 is a perspective view, illustrating the same, of the cup. Fig. 17 is a transverse sectional view, partly in elevation, of a bearing-casing, illustrating another form of locking device. Fig. 18 is an elevation, partly in section, of a shaft, showing the means for attaching the ball-engaging shoulders or cones. Fig. 19 is a sectional view of the cone detached. Fig. 20 is an end view of the same. Figs. 21 and 22 are longitudinal sectional views showing portions of the wheel hub, illustrating different ways of forming the same for the reception of straight tangent spokes.

Heretofore it has been proposed and attempted to securely clamp the adjusted cup of a ball-bearing, previously locked positively by a loose ring, by means of a nut or screw ring on the cup and engaging the hub not directly but through the medium of said loose ring. This has proved insecure in practice by reason of the interposition of this third part—namely, the loose ring—between the hub and nut.

The first feature of my invention has for its object the clamping of the parts of a ball-bearing in which such a loose ring or spur is employed in such manner that they will not become loose by the jarring involved in the use of the machine; and to this end it consists in combining with the spur, ring, or equivalent device for positively locking from rotation the adjustable ball-bearing cup a nut or screw ring adapted to be clamped in position by screwing it directly against the hub independent of the spur and not having its frictional bearing upon the latter.

Referring to the drawings, 1 indicates the frame of the bicycle, in connection with which machine I have chosen to illustrate my invention, 2 and 3, the front and rear wheels; 4, the wheel-hubs; 5, the spokes; 6, the crank-shaft; 7, the hanger, box, or bearing for the latter; 8, the cranks, and 9 and 10 the driving and rear sprockets. All of these parts, as well as those hereinafter described, may be of any preferred and suitable construction excepting as hereinafter pointed out as essential to the invention.

Referring now to the bearings and the means for adjusting and locking the same, as illustrated in the crank-shaft bearing in connection with a rotary axle, 6 indicates said axle provided with ball-bearing shoulders B with which engages the balls, cylinders, cones, or equivalent devices C. It is to be understood that the axle is ordinarily supported at two or more points, say at each end, and a description of the balls and coöperating parts at one end will suffice for both.

D is a casing—in this instance the crank-axle hanger—supported in the usual manner on the lower part of the frame 1, comprising two members which engage each other by a screw-thread. One of said members E is interiorly screw-threaded, as at 12, and the other member F is provided with ball-bearing shoulders G, adapted to coöperate with the shoulders B in engaging the balls C, and with an exterior screw-thread 13 fitting the thread 12. By turning the member F it will be longitudinally adjusted in the member E, thereby regulating the tightness of the ball-bearing. After said adjustment the member F is clamped rigidly in position by a nut or ring H, having an interior screw-thread 14 engaging a thread on said part F. This latter thread may be a continuation of the thread 13, (see Figs. 12, 13, and 16;) but it is preferred to make it a screw-thread of opposite direction to the thread 13, as illustrated at s in Fig. 18, whereby the nut H is much more effective to clamp the members E and F securely together. In connection with said clamping means, the operation of which has a tendency to rotate the member F and destroy its adjustment, my invention consists in means for locking the two members together either temporarily or otherwise to prevent any such undesired turning of the member F under the action of the nut, which means shall not interfere with the above-described direct engagement of the nut H with the member E. It is also essential that said locking means shall have the generic feature that it is loose, so that while engaging or connected with one of the members so as not to be rotatable independent thereof it may be pressed by the finger or mechanically directly or in right lines against the surface of the other member while the adjustment of the parts is being effected, whereby the operator by his finger or hand or the action of the device under a spring-pressure may detect that the locking means has engaged also said other member to secure the two members together while the nut is screwed up. A locking means having these characteristics may take various forms having the described generic feature or features in common, which forms or certain of them I have illustrated and will describe. Referring now to the drawings, J indicates a series of locking-shoulders arranged around one of said members at suitable intervals, for instance, as shown. K' is a loose spur connected with or adapted to engage the other member, as by a locking-shoulder I, and to be pressed by the finger or otherwise yieldingly in right lines directly toward and against the surface in which is formed the series of shoulders J. Having determined how far to screw up or unscrew the member F, the operator turns the rotary member. As the latter approaches its desired final position he, having the spur K in engagement with the shoulder I of one member, presses the spur or allows it to press yieldingly against the surface of the other member, continuing at the same time to turn the rotary member. When the next shoulder of the series J comes in line with the spur, the latter will be pressed into it and arrest the rotary member. While the members are thus locked together, the nut H is screwed up, as already described, into direct engagement with the member E. Referring now more particularly to the differing details of construction illustrated, the spur may be connected with or engage primarily either of said members of the casing, the series of locking-shoulders being provided on the other member. It may be loosely movable toward the latter member either longitudinally or radially. Its pressure toward the latter member may be given by hand or by a spring. It may be connected with the former member merely by abutting a locking-shoulder or in other more permanent manner, as through the medium of the last-mentioned spring, and it may effect the locking only temporarily while the two members are being clamped together, or its locking action may continue until the bearing is next to be adjusted.

Figs. 2, 4, 9, 10, 12, and 14 illustrate an arrangement in which the spur K is formed on a loose ring 16 encircling the member E at or near the end thereof, which ring is freely movable longitudinally toward or from the said member to engage the spur with or disengage it from the shoulders J, formed in its end surface by notching the same. The inner end of the spur engages continually with the shoulder I, formed by a groove in the member F. The arrangement of the ring 16 is such that it does not interfere with the direct engagement between the nut H and member E, but serves to cover the shoulders J, concealing them and serving as a dustguard. While but one spur may be employed, I prefer to form the ring 16 with two diametrically opposite spurs, Fig. 14, and the member F with two corresponding shoulders I, Fig. 12, thereby giving more leverage to the ring in turning and holding the rotary member. The exterior of the ring 16 may be suitably knurled or formed to be readily grasped by the thumb and finger in the adjusting operation. The spur K need not engage a groove or notch in the part F, but may be extended into the form of a flattened interior surface or surfaces of well-known character adapted to engage corresponding surfaces $f$ on the member F, Fig. 13, to hold the latter from rotation.

In Figs. 15 and 16 the carrying-ring 16 for the spur K' is dispensed with and the latter formed on a slide 17, held in an undercut groove 18 in the rotary member F, in which it has sufficient longitudinal play to disengage from and engage with the shoulders J, being held from escape from the groove 18 by a stop-pin 19.

In Fig. 17 the shoulder is formed in or on the member E and the spur $K^2$, while engaging said shoulder, 7 is radially and yieldingly movable toward the surface of the member F, in which latter are formed the shoulders J'. In Fig. 17 the spur is carried by a spring 20, fixed in a recess on the member E at 21. With this construction the spur need not be pressed by hand on the surface of the part F as the latter is being adjusted, as the spring 20 will perform this function. The flange of the nut H may screw over and protect the spring and hold down the spur, as shown by dotted lines in Fig. 17. When thus the spur is connected with one member by a spring, the point of engagement 21 of the spring is to be considered as the shoulder I or its equivalent.

The principle of my invention is the same when applied to a construction in which the shaft is fixed and the casing revolves, as in the case of a front or rear wheel, and in Figs. 7, 9, and 10 I have shown it so applied to a fixed shaft 22. It will also be understood that while a means for locking and adjusting at one end only of the bearing is ordinarily sufficient my improvements may be provided at both ends, as seen in Figs. 2, 4, and 9.

In the construction of the fixed and rotary shafts it has been attempted to form their ball-bearing shoulders or cones B integral with the shaft; but this has been found to be very objectionable in that the shaft and cones must be of radically-different tempers, the former soft and the latter very hard. It has also been attempted to form said cones separately and force them upon the shaft, so as to be tight thereon. In many cases in attempting to get the requisite tightness of fit the brittle and inelastic cones would be burst, while if this bursting was prevented the cones frequently fitted with insufficient tightness and became loose, so as to move on the shaft. By the present feature of my invention I obviate these difficulties. I form the interior of the cone B, Figs. 18 to 20, with sharp longitudinal corrugations 23, adapted when the cone is hardened to cut corresponding grooves in the shaft. The latter is formed with enlargements 24, upon which the cones B are forced longitudinally up against shoulders 25, as seen at the right of Fig. 18. The enlargements 24 have a radius about equal to that of the bottoms of the corrugations 23, so that the latter cut their way well into the surface of the shaft, removing enough of the latter to prevent the bursting of the cone. In order to give a clearance for the shavings cut from the parts 24 and enable the cones to come solidly against the shoulders 25, I bevel or incline the inner ends of the corrugations, as shown at 26. This also gives the cone enough compressing or wedging action on the shaft to insure a perfectly-tight fit.

Referring now to that part of my invention relating to the exterior formation of the bearing-casing, and particularly to Figs. 3 to 8, the hub 4 is formed in one piece of steel, with radial peripheral flanges L integral therewith, Fig. 3. Said flanges are then bored with longitudinal holes forming interior arched seats M for the spoke-heads, Fig. 5. The holes of the two flanges are not in line, but arranged, as seen in the figure, to bring the spokes in proper alternate position on the rim. 5 indicates the spokes, having their heads within the seats M and passing radially from said seats through radial holes P, Figs. 4 and 8. I prefer to further finish and lighten the hub by removing exterior portions of the flanges, leaving recesses Q between the seats, Fig. 6, and by grooving the sides of the flanges L, Figs. 7, 21, and 22, so as to leave concentric flanges R connecting the arches and radial webs S, which carry the flanges R. The flanges may be grooved, so as to leave the webs S on either their inner sides, Fig. 21, or on their outer sides, Fig. 22. The holes P may be and are preferably countersunk interiorly, thus concealing the heads of the spokes. I am thus enabled to form a light hub of great strength in which the straight tangent spokes are furnished with accurate seats transverse to the directions of the spokes.

I claim—

1. In a bearing for bicycles or like purposes a hub or barrel provided with a series of recesses or shoulders, having an axle with a ball-bearing shoulder, a longitudinally-adjustable screw-threaded ball-bearing cup having an exterior groove and screwed into the end of said barrel, antifriction-balls against and between the said shoulder and cup, a ring having a spur which engages both a recess of said barrel and the groove of said cup to hold the latter positively from rotation, and a nut or ring screwing on the cup, confining said spur and engaging directly against the hub to lock itself and the cup independently of the spur.

2. In a bearing for bicycles and other purposes the combination with an axle having ball-bearing shoulders or cones, and balls or equivalent devices engaging the same, of a casing comprising two members engaging each other by a screw-thread one of which members is provided with ball-bearing shoulders and is longitudinally adjustable by said thread to regulate the tightness of the bearing, one of said members being provided with a locking-shoulder and the other with a series of locking-shoulders, a loose ring having an inwardly-extending spur adapted to engage said locking-shoulder of one member and to be pressed in right lines directly toward the other member to engage one of said series of shoulders, whereby it may lock said members against relative rotation, and a nut or ring screwing on one of said members and tightly engaging directly against the other member, the locking-spur being at the inner side of the nut and held in its locking position thereby.

3. In a bearing for bicycles and like purposes the combination of a barrel or hub, an axle therein having shoulders, cups or rings in the hub having opposing shoulders, one of which cups is exteriorly threaded and adjustable longitudinally of the axle, bearing-balls between said shoulders, a ring exterior to and around the end of the barrel having a locking-spur engaging the barrel and cup to prevent rotation and longitudinally movable relative to said parts, and a locking ring or nut screwing on said cup and tightly engaging directly against the barrel and on the outer side of and retaining the locking-spur.

4. In a bearing for bicycles and other purposes, the combination of a barrel or hub, having on its end a series of notches, an axle therein having shoulders, cups or rings in the barrel or hub having opposing shoulders, one of which cups is exteriorly threaded and provided with a longitudinal groove and adjustable longitudinally of the axle, balls or equivalent devices between said shoulders, a locking-spur of less lateral dimension than the depth of said notches adapted to engage one of the latter and also said groove of the cup, means for holding the spur in position and a ring or nut screwing on said cup and clamping directly against the barrel at the outer side of the spur to confine the latter and to clamp itself and the cup independently of the spur.

5. In a roller-bearing, the combination with a shaft, of a shoulder or cone of hard material formed with an internal bearing having sharp corrugations adapted to cut into the material of the latter when the cone is forced thereon.

6. The combination with the shaft, of the cone having the sharp internal cutting corrugations beveled at their ends.

7. As a new article of manufacture, a shoulder or cone for ball-bearings formed of hard material and having sharp internal cutting corrugations.

8. As a new article of manufacture a wheel-hub for straight tangent spokes, consisting of a barrel formed with radial flanges integral therewith, which flanges are grooved on their sides to leave radial webs S and lateral flanges R, and bored with longitudinal holes forming interior arched seats for the spoke-heads.

9. As a new article of manufacture a wheel for straight tangent spokes, consisting of a barrel formed with radial flanges integral therewith, which flanges have the external recesses Q and are grooved to leave radial webs S and inwardly-extending flanges R, and bored intermediately of said recesses with longitudinal holes forming interior arched seats for the spoke-heads.

In testimony whereof I affix my signature in the presence of two witnesses.

WILLIAM N. WHITELY.

Witnesses:
H. N. LOW,
HOMER MORRIS.